(12) United States Patent
Shoji et al.

(10) Patent No.: US 7,992,929 B2
(45) Date of Patent: Aug. 9, 2011

(54) SUPPORT MECHANISM FOR OPENING AND CLOSING MEMBER

(75) Inventors: Akitoshi Shoji, Kariya (JP); Yoshitake Ide, Anjo (JP); Kazuki Sawada, Handa (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 12/659,568

(22) Filed: Mar. 12, 2010

(65) Prior Publication Data

US 2010/0308625 A1    Dec. 9, 2010

(30) Foreign Application Priority Data

Mar. 31, 2009    (JP) .................. 2009-085539

(51) Int. Cl.
*B60J 7/057* (2006.01)
(52) U.S. Cl. ................................. 296/216.08
(58) Field of Classification Search ...... 296/216.01–224
See application file for complete search history.

(56) References Cited

U.S. PATENT DOCUMENTS

| 3,671,997 | A  | * | 6/1972  | Sigmund ...................... 16/93 R |
| 4,984,332 | A  | * | 1/1991  | Bienert et al. ................ 16/93 R |
| 6,799,796 | B2 | * | 10/2004 | Radmanic ................ 296/216.08 |
| 2008/0191519 | A1 | * | 8/2008 | Sawada et al. ................ 296/219 |

FOREIGN PATENT DOCUMENTS

JP           3-25026          2/1991

* cited by examiner

*Primary Examiner* — Dennis H Pedder
(74) *Attorney, Agent, or Firm* — Finnegan, Henderson, Farabow, Garrett & Dunner, LLP.

(57) ABSTRACT

A support mechanism for an opening and closing member slidably moving to open and close an opening formed in a vehicle body, includes a support frame adapted to be arranged at the opening and closing member to support the opening and closing member relative to the vehicle body, a guide rail adapted to be arranged at the vehicle body along a side edge of the opening and including first and second guide portions that are parallel to each other, and a guided member including a cylindrical portion and a bearing portion continuously formed with the cylindrical portion and coaxially supporting a shaft portion that is arranged at the support frame, the cylindrical portion having an outer peripheral surface formed into a tapered shape and contacting the first and second guide portions in a biased manner.

15 Claims, 5 Drawing Sheets

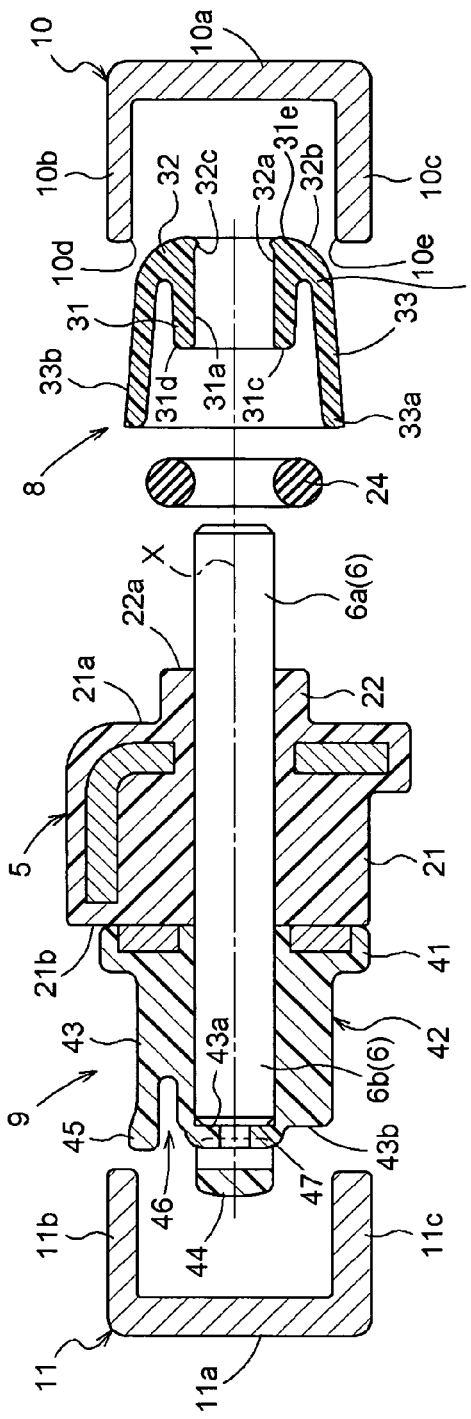
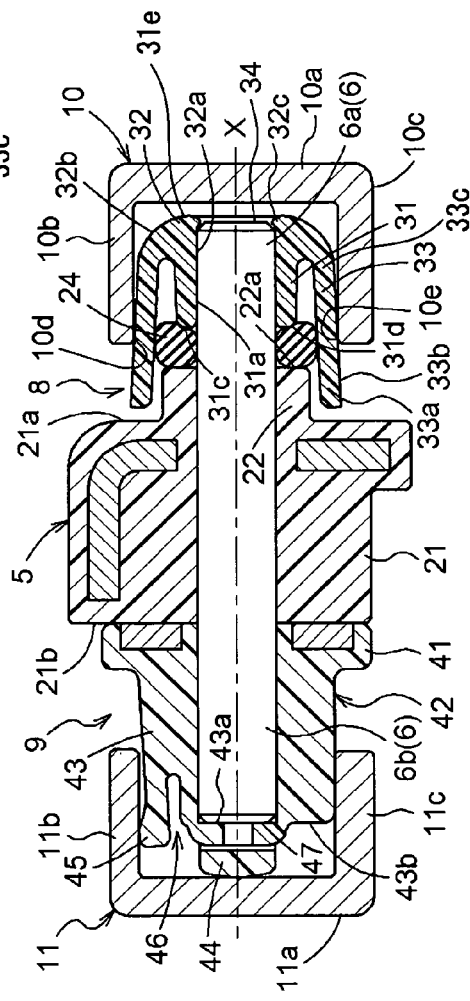
FIG. 3A
FIG. 3B

SUPPORT MECHANISM FOR OPENING AND CLOSING MEMBER

CROSS REFERENCE TO RELATED APPLICATIONS

This application is based on and claims priority under 35 U.S.C. §119 to Japanese Patent Application 2009-085539, filed on Mar. 31, 2009, the entire content of which is incorporated herein by reference.

TECHNICAL FIELD

This disclosure relates to a support mechanism for an opening and closing member, which slidably moves so as to open and close an opening formed in a vehicle body.

BACKGROUND DISCUSSION

A known opening and closing mechanism includes an opening and closing member arranged at a roof portion of a vehicle body and slidably moving to open and close an opening of the roof portion in order to let in air or light from an exterior side to an interior side of a vehicle. Such opening and closing mechanism generally includes a support frame arranged at the opening and closing member to thereby support the opening and closing member relative to the vehicle body, a guided member arranged at the support frame, a guide rail guiding the guided member along a side edge of the opening of the roof portion, and a driving device moving the support frame slidably along the guide rail.

While the vehicle is moving, the opening and closing member may be moved vertically by wind pressure or the like, therefore causing a flutter behavior in which the guided member irregularly interferes with the guide rail. In case of the occurrence of noise and vibration caused by the flutter behavior, comfort in a vehicle interior space may be deteriorated.

Accordingly, for example, a known slide shoe for a sliding roof, which is disclosed in JP1991-025026A, serves as a guided member that is guided by a guide rail having a U-shaped cross-section. The slide shoe is formed to be an approximately elongated elliptical shape in lateral cross-section. Further, the slide shoe includes a slide shoe body made of rubber and a slide casing made of synthetic resin and covering the slide shoe body. The slide shoe body includes an insertion groove into which a holder protruding from a support frame is inserted.

According to the slide shoe as configured above, when an opening and closing member is moved in a vertical direction of a vehicle by wind pressure or the like, one portion of the slide shoe body is elastically deformed and compressed. Accordingly, even when the holder is moved in the vertical direction, the slide casing does not move in the vertical direction. As a result, the slide casing does not hit or impact against the guide rail, therefore reducing noise and vibration due to the vertical movement of the opening and closing member. In addition, the slide shoe body serves as a damper to thereby absorb vibration energy. Accordingly, the noise and vibration is further minimized.

However, when the vertical movement of the holder further increases, the slide shoe body may not be sufficiently elastically deformed to minimize the movement of the holder. Moreover, when the holder is moved in the vertical direction at an extremely rapid pace, the elastic deformation of the slide shoe body may not be sufficient to absorb vibration caused by the movement of the holder. As a result, a clearance is generated between the slide shoe body and the slide casing; therefore, the slide shoe body hits against the slide casing. Consequently, noise and vibration occur between the slide shoe body and the slide casing; therefore, the opening and closing member may not slide smoothly.

A need thus exists for a support mechanism for an opening and closing member, which is not susceptible to the drawback mentioned above.

SUMMARY

According to an aspect of this disclosure, a support mechanism for an opening and closing member slidably moving to open and close an opening formed in a vehicle body includes a support frame adapted to be arranged at the opening and closing member to support the opening and closing member relative to the vehicle body, a guide rail adapted to be arranged at the vehicle body along a side edge of the opening and including first and second guide portions that are parallel to each other, and a guided member including a cylindrical portion and a bearing portion continuously formed with the cylindrical portion and coaxially supporting a shaft portion that is arranged at the support frame, the cylindrical portion having an outer peripheral surface formed into a tapered shape and contacting the first and second guide portions in a biased manner.

According to another aspect of the disclosure, a support mechanism for an opening and closing member slidably moving to open and close an opening formed in a vehicle body, includes a support frame adapted to be arranged at the opening and closing member to support the opening and closing member relative to the vehicle body, a guide rail adapted to be arranged at the vehicle body along a side edge of the opening and including first and second guide portions that are parallel to each other, a guided member including a cylindrical portion and a bearing portion continuously formed with the cylindrical portion and coaxially supporting a shaft portion that is arranged at the support frame, the cylindrical portion having an outer peripheral surface formed into a tapered shape and contacting the first and second guide portions in a biased manner, and an elastic member pressing the outer peripheral surface of the cylindrical portion against the first and second guide portions in a biased manner.

BRIEF DESCRIPTION OF THE DRAWINGS

The foregoing and additional features and characteristics of this disclosure will become more apparent from the following detailed description considered with the reference to the accompanying drawings, wherein:

FIG. 3A is a cross-sectional view showing a condition before first and second shoes are attached to a support frame;

FIG. 3B is a cross-sectional view showing a condition where the first and second shoes are attached to the support frame;

DETAILED DESCRIPTION

Figure 1:
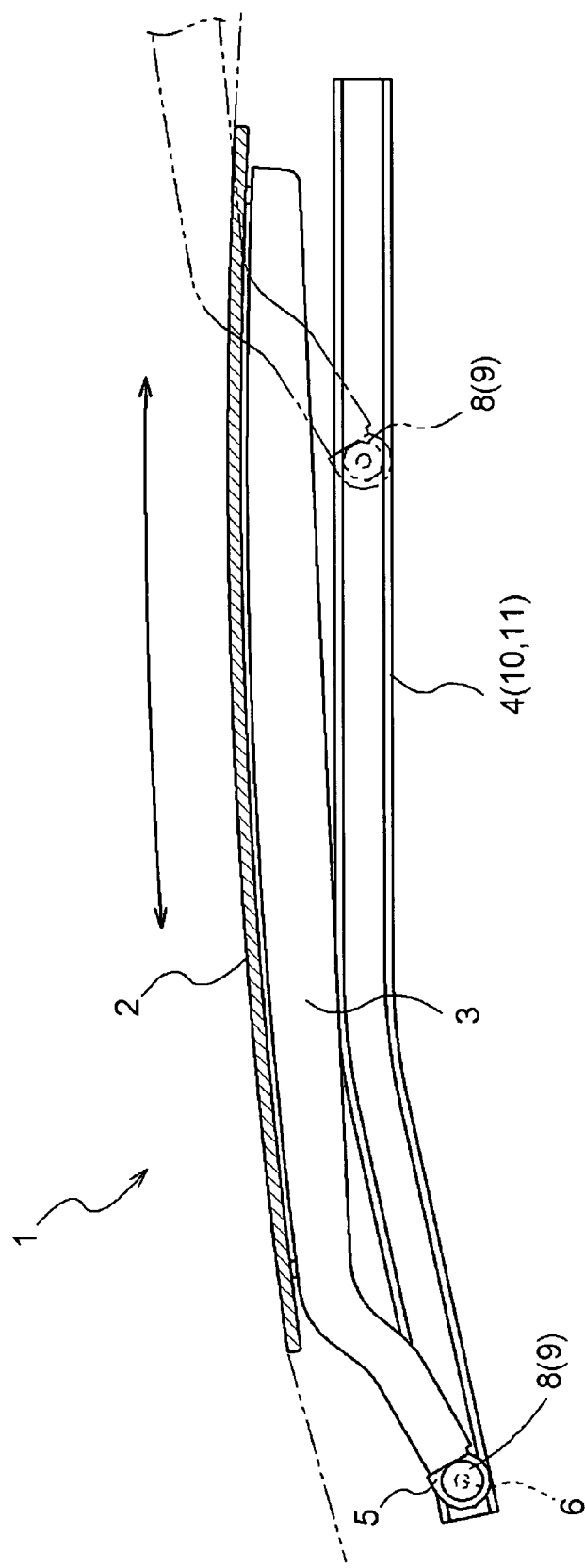
FIG. 1 is a lateral view of a support mechanism for an opening and closing member according to a first embodiment disclosed here.
Figure 2:
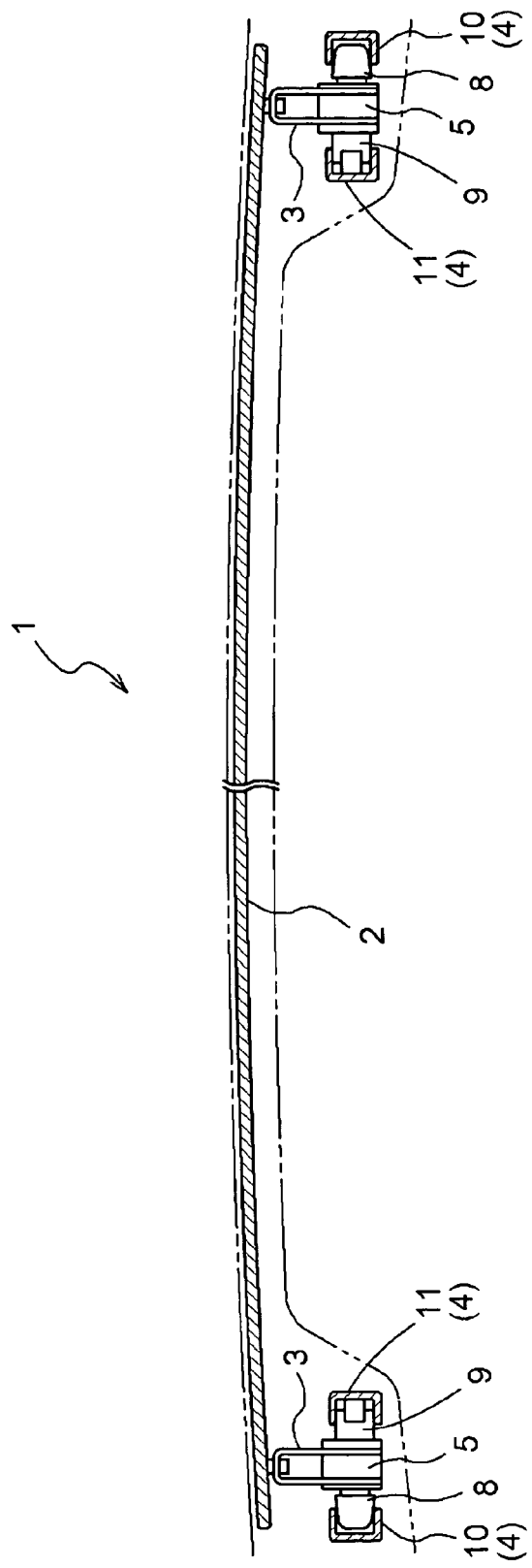
FIG. 2 is a cross-sectional view of the support mechanism for the opening and closing member according to the first embodiment disclosed here.

A sunroof apparatus will be explained as an example of a support mechanism for an opening and closing member according to a first embodiment with illustrations of drawings as follows. As illustrated in FIG. 1 and FIG. 2, the sunroof apparatus includes a sunroof (opening and closing member) 2 provided so as to slidably move and open and close an opening 1 formed in a vehicle body, a bilateral pair of metallic frames 3 serving as support frames and adapted to be arranged at the sunroof 2 so as to support the sunroof 2 relative to the vehicle body, a bilateral pair of metallic guide rails 4 guiding the frames 3, and a drive mechanism moving the pair of frames 3 in a longitudinal direction of a vehicle. In addition, since the frames 3 and the guide rails 4 have the same configurations at right and left sides of the vehicle, the frame 3 and the guide rail 4 at the right side of the vehicle will be explained in the first embodiment and explanations of the frame 3 and the guide rail 4 at the left side of the vehicle will be omitted hereinafter.

As shown in FIG. 1, the frame 3 is an elongated member extending in the longitudinal direction of the vehicle. A front side of the frame 3 is configured so as to tilt downwardly. A shaft attachment member 5 is arranged at an end of the front side of the frame 3. A protruding pin 6 serving as a shaft portion is attached to the shaft attachment member 5 so as to penetrate therethrough and protrude from both ends of the shaft attachment member 5 in a lateral direction of the vehicle.

As shown in FIG. 3, the protruding pin 6 includes a first protruding portion 6a protruding toward the right side (exterior side) of the vehicle and a second protruding portion 6b protruding toward the left side (interior side) of the vehicle in the lateral direction thereof. The first protruding portion 6a is an example of a small diameter portion of the shaft portion. The first protruding portion 6a has a predetermined outer diameter. A first shoe (guided member) 8 made of resin is attached to the first protruding portion 6a so as to be slidable along the lateral direction of the vehicle (an axial direction X of the protruding pin 6) and rotatable around the axial direction X. A second shoe (guided member) 9 is attached to the second protruding portion 6b so as to be slidable along the lateral direction.

As illustrated in FIG. 2, the guide rail 4 includes a first rail 10 guiding the first shoe 8, a second rail 11 guiding the second shoe 9, and a lower rail supporting a drive belt driven by the drive mechanism. Each of the first and second rails 10 and 11 is an example of the guide rail 4.

As illustrated in FIG. 3, the first rail 10 includes a side surface portion 10a serving as a center wall portion, a ceiling surface portion 10b serving as a wall portion, and a bottom surface portion 10c serving as a wall portion and facing the ceiling surface portion 10b in parallel thereto. The side surface portion 10a is arranged between the ceiling surface portion 10b and the bottom surface portion 10c. The first rail 10 is formed to have a recessed cross-section defined by the side surface portion 10a, the ceiling surface portion 10b, and the bottom surface portion 10c. Similarly, the second rail 11 includes a side surface portion 11a, a ceiling surface portion 11b, and a bottom surface portion 11c while being configured so as to have a recessed cross-section. A frame support mechanism is arranged at a rear side of the guide rail 4 illustrated in FIG. 1. The frame support mechanism includes an engagement pin intruding in a groove of the frame 3 to thereby support the frame 3.

A metallic frame is embedded in resin to thereby form the shaft attachment member 5. The shaft attachment member 5 includes a main body member 21 and a cylindrical rib-shaped member 22 serving as a large diameter portion of the shaft portion and arranged side by side relative to the first protruding portion (small diameter portion) 6a of the shaft portion. The cylindrical rib-shaped member 22 protrudes from a side surface 21a of the main body member 21 at a right side thereof while being arranged so as to surround the first protruding portion 6a serving as the small diameter portion of the shaft portion. The cylindrical rib-shaped member 22 includes an outer diameter larger than the predetermined outer diameter of the first protruding portion 6a.

A ring member 24 made of rubber and serving as an elastic member and the resin first shoe 8 are attached to the first protruding portion 6a. The ring member 24 is configured to be more flexible than the first shoe 8. Further, the ring member 24 is elastically deformable and formed to have a circular shape in cross-section.

Figure 4:
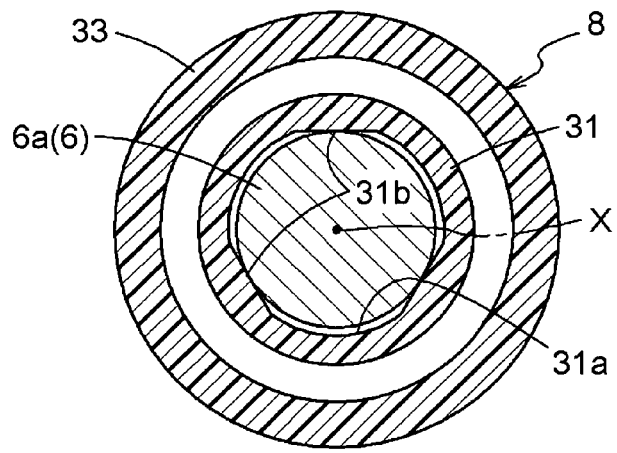
FIG. 4 is a cross-sectional view of the first shoe.

As illustrated in FIGS. 3A, 3B, and 4, the first shoe 8 includes a bearing portion 31 coaxially supporting the first protruding portion 6a in the axial direction X, a curved portion 32, and a contacting portion 33 serving as a cylindrical portion. The curved portion 32 serves as a continuously formed portion extending continuously between the bearing portion 31 and the contacting portion 33 and contacts the side surface portion 10a of the first rail 10. The contacting portion 33 is in contact with first and second guide portions 10d and 10e of the first rail 10 in a biased manner while sliding along the first rail 10. The first and second guide portions 10d and 10e are formed at respective free ends of the ceiling surface portion 10b and the bottom surface portion 10c of the first rail 10.

The bearing portion 31 is formed in a cylindrical shape. As shown in FIG. 4, three flat surface portions 31b in contact with the first protruding portion 6a along the lateral direction are formed on an inner circumferential surface 31a of the bearing portion 31. The flat surface portions 31b are arranged in three phases on the inner circumferential surface 31a. The three phases of the flat surface portions 31b are different from one another by 120 degrees. A relative positioning between the bearing portion 31 and the first protruding portion 6a is defined by a three-point support of the flat surface portions 31b. Accordingly, a clearance between the bearing portion 31 and the first protruding portion 6a is appropriately maintained to thereby smoothly rotate the first shoe 8 around the axial direction X. Moreover, the number of flat surface portions 31b is not limited to three and a multitude of flat surface portions 31b, for example, three or more flat surface portions 31b, may be applicable.

A round-shaped portion 31d is formed at a first end portion 31c (positioned adjacent to the shaft attachment member 5) of the bearing portion 31. In case where the round-shaped portion 31d is not formed at the first end portion 31c of the bearing portion 31, the ring member 24 may be damaged by an edge of the first end portion 31c when the first end portion 31c contacts the ring member 24. Such damage occurs because the bearing portion 31 is more rigid than the ring member 24. Thus, as in the first embodiment, the round-shaped portion 31 is formed at the first end portion 31c of the bearing portion 31 and thereby prevents the damage of the ring member 24 even when the first end portion 31c contacts the ring member 24.

The curved portion 32 is curved at a second end portion 31*e* (positioned close to the side surface portion 10*a* of the first rail 10) of the bearing portion 31 toward the second end portion 31*e* thereof while continuously extending between the beating portion 31 and the contacting portion 33. An outer peripheral surface 32*b* of the curved portion 32 is formed in a spherical shape. A through-hole 32*a* into which the first protruding portion 6*a* is inserted is formed in the curved portion 32.

According to the first embodiment, the through-hole 32*a* is formed in the curved portion 32 so as to penetrate therethrough. Alternatively, when the curved portion 32 is configured so as not to include such through-hole 32, the first protruding portion 6*a* does not penetrate through an end side of the curved portion 32 and slide out of the curved portion 32.

A base side of the curved portion 32 is disposed between the ceiling surface portion 10*b* and the bottom surface portion 10*c* of the first rail 10 and the first protruding portion 6*a*. The base side of the curved portion 32 is formed in a torus shape to have high rigidity and therefore is not easily compressively deformed. Meanwhile, the contacting portion 33 is formed in a cylindrical shape to have low rigidity and therefore is flexibly deformed. Accordingly, in case where an impact load acts on the vehicle to thereby apply a large force to the first shoe 8 in a vertical direction of the vehicle, the base side of the curved portion 32 makes contact with the ceiling surface portion 10*b* or the bottom surface portion 10*c* and appropriately prevents the first shoe 8 from further moving in the vertical direction.

That is, at an early stage where the impact load acts on the vehicle, the contacting portion 33 is flexibly deformed and a restoring force occurs in a direction allowing the first shoe 8 to be returned in a neutral position. When an external force larger than such restoring force generated by the first shoe 8 occurs, the base side of the curved portion 32 makes contact with the ceiling surface portion 10*b* or the bottom surface portion 10*c* and thereby prevents the first shoe 8 from being further moving in the vertical direction. Thus, the force acting on the first shoe 8 is received by the contacting portion 33 and the curved portion 32 having a different rigidity from each other, therefore preventing the first shoe 8 from moving too close to the ceiling surface portion 10*b* or the bottom surface portion 10*c*.

A small flanged portion 32*c* serving as a protrusion preventing portion is formed at the second end portion 31*e* of the bearing portion 31 and along the through-hole 32*a* of the curved portion 32 so as to extend radially inwardly from the outer peripheral surface 32*b*. Accordingly, even when the first protruding portion 6*a* is moved toward the second end portion 31*e* of the bearing portion 31, the flanged portion 32*c* engages with an end face 34 of the first protruding portion 6*a* and thereby prevents the first protruding portion 6*a* from further moving toward the second end portion 31*e* of the bearing portion 31. Consequently, the first protruding portion 6*a* is prevented from sliding out of the curved portion 32 and interfering with the first rail 10.

The contacting portion 33 includes first and second end portions 33*c* and 33*a* oppositely arranged in the axial direction X of the bearing portion 31. The first end portion 33*c* having an outer diameter smaller than an outer diameter of the second end portion 33*a* is continuously formed with the bearing portion 31 via the base side of the curved portion 32. The contacting portion 33 is flexible and formed to have the cylindrical shape. An outer peripheral surface 33*b* of the contacting portion 33 is formed to have a tapered shape including a diameter that increases toward the second end portion 33*a* of the contacting portion 33, thereby being in contact with the ceiling surface portion 10*b* and the bottom surface portion 10*c* of the first rail 10 in a biased manner. A clearance is formed between the contacting portion 33 and the bearing portion 31 within the first shoe 8.

The first end portion 31*c* of the bearing portion 31 and an end portion 22*a* of the rib-shaped member 22 press the ring member 24 in the lateral direction of the vehicle while the contacting portion 33 and the first protruding portion 6*a* press the ring member 24 in a radial direction thereof. Accordingly, the ring member 24 is elastically deformed so as to intrude in the clearance between the bearing portion 31 and the contacting portion 33.

An upper portion of the contacting portion 33 is elastically inwardly deformed in accordance with an upward movement of the first protruding portion 6*a*. At this time, a portion of the ring member 24, which is sandwiched between the upper portion of the contacting portion 33 and the first protruding portion 6*a* is elastically deformed in the radial direction. Further, elastic forces of the contacting portion 33 and the ring member 24 cause an upper portion of the outer peripheral surface 33*b* of the contacting portion 33 to contact the ceiling surface portion 10*b* with a biasing force that is stronger than a usual biasing force.

A lower portion of the contacting portion 33 is elastically outwardly deformed in accordance with the upward movement of the first protruding portion 6*a*. At this time, a portion of the ring member 24, which is sandwiched between the lower portion of the contacting portion 33 and the first protruding portion 6*a* is elastically deformed in the radial direction. Further, the elastic forces of the contacting portion 33 and the ring member 24 cause a lower portion of the outer peripheral surface 33*b* of the contacting portion 33 to contact the bottom surface portion 10*c* with a biasing force that is smaller than a usual biasing force.

Thus, a contact state of the outer peripheral surface 33*b* of the contacting portion 33 with the ceiling surface portion 10*b* and the bottom surface portion 10*c* is desirably maintained regardless of a vertical movement of the first protruding portion 6*a*. As a result, the outer peripheral surface 33*b* of the contacting portion 33 is prevented from impacting or hitting against the ceiling surface portion 10*b* and the bottom surface portion 10*c*, thereby inhibiting noise and vibration caused by the impact.

A force acting on the first rail 10 in the lateral direction of the vehicle occurs due to an inclination of the outer peripheral surface 33*b* of the contacting portion 33. The lateral force acts in a direction in which the first shoe 8 is detached from the first rail 10. The first shoe 8 is positioned at the neutral position where the lateral force of the first shoe 8 is proportional to a reactive force of the shaft attachment member 5 to thereby stabilize the first shoe 8 in the lateral direction of the vehicle.

The upper portion of the outer peripheral surface 33*b* of the contacting portion 33 contacts the ceiling surface portion 10*b* in a biased manner and the lower portion of the outer peripheral surface 33*b* of the contacting portion 33 contacts the bottom surface portion 10*c* in the biased manner. At this time, a moment rotating the bearing portion 31 is generated by reactive forces received by the respective upper and lower portions of the outer peripheral surface 33*b* of the contacting portion 33. The moment causes vibration between the bearing portion 31 and the first protruding portion 6*a*.

According to the first embodiment, the bearing portion 31 is arranged radially inwardly in an inner peripheral side of the contacting portion 33, thereby positioning the bearing portion 31 and the contacting portion 33 radially closer to each other as compared with a configuration where the beating portion 31 protrudes further toward the interior side of the vehicle in the lateral direction thereof than the contacting portion 33. As a result, the moment may be reduced; therefore, the vibration between the bearing portion 31 and the first protruding portion 6a is minimized.

The second end portion 33a of the contacting portion 33, having the larger diameter as compared with the outer diameter of the first end portion 33c of the contacting portion 33 protrudes further toward the interior side of the vehicle in the lateral direction than the first end portion 31c of the bearing portion 31. The second end portion 33a of the contacting portion 33 is arranged radially outwardly adjacent to the rib-shaped member 22. A cylindrical clearance is defined between the second end portion 33a and the rib-shaped member 22 within the first shoe 8. Accordingly, even when the position of the first shoe 8 relative to the axial direction X changes excessively, the second end portion 33a contacts the rib-shaped member 22 to thereby prevent the position of the first shoe 8 from further changing. Consequently, even when vibration occurs between the bearing portion 31 and the first protruding portion 6a, such vibration does not easily occur between the rib-shaped member 22 and the second end portion 33a of the contacting portion 33. The second end portion 33a is an overlapping portion overlapping radially outwardly with the rib-shaped member 22.

The second shoe 9 made of resin is arranged at the second protruding portion 6b.

As illustrated in FIGS. 3A and 3B, a metallic frame is embedded in resin to thereby form the second shoe 9 and the second shoe 9 includes a base member 41 having an approximately circular disc shape and an end member (cylindrical portion) 42 forming an approximately cylindrical shape and fitting into the second rail 11. The end member 42 is provided at a first end portion of the second shoe 9 while the base member 41 is provided at a second end portion of the second shoe 9. The first end portion has an outer diameter smaller than an outer diameter of the second end portion while being formed into a convex shape. The convex shaped portion of the first end portion is positioned adjacent to the side surface portion 11a of the second rail 11 in a recessed space thereinside. Moreover, the base member 41 of the second shoe 9 is connected to the vehicle body; therefore the second shoe 9 does not rotate around the axial direction X.

Figures 5A, 5B:
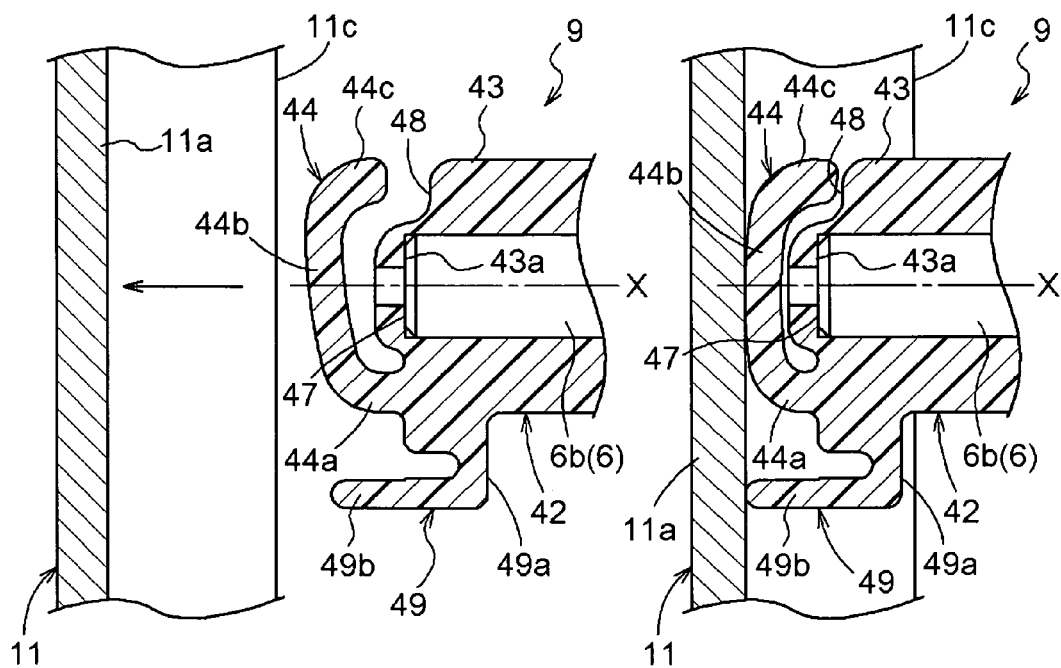
FIG. 5A is a cross-sectional view showing a condition before the second shoe contacts a second rail.
FIG. 5B is a cross-sectional view showing a condition where the second shoe is in contact with the second rail.

The end member 42 of the second shoe 9 includes a bearing portion 43, a tongue-shaped portion 45, an arm portion 44, and an L-shaped portion 49 (see FIGS. 5A and 5B). The bearing portion 43 supports the second protruding portion 6b. The tongue-shaped portion 45 slides along the second rail 11 while being in contact with the ceiling surface portion 11b of the second rail 11 in a biased manner. The arm portion 44 slides along the second rail 11 while being in contact with the side surface portion 11a of the second rail 11 in a biased manner. The L-shaped portion 49 slides along the second rail 11 while being in contact with the side surface portion 11a.

The bearing portion 43 is formed in an approximately cylindrical shape, thereby forming a rigid portion extending from the base side (positioned adjacent to the shaft attachment member 5) to the end side (positioned close to the side surface portion 11a of the second rail 11). A small flanged portion 43a is formed at an inner circumferential portion of the bearing portion 43 so as to extend radially inwardly. Accordingly, even when the second protruding portion 6b is moved toward the second rail 11, the flanged portion 43a engages with an end face 47 of the second protruding portion 6b to thereby prevent the second protruding portion 6b from further moving in the lateral direction of the vehicle toward the second rail 11. Consequently, the second protruding portion 6b is prevented from sliding out of the end member 42.

A second notched portion 46 is formed at an upper portion of the end side of the bearing portion 43 (see in FIGS. 3A and 3B). The tongue-shaped potion 45 is formed at a base side of the second notched portion 46 while extending from the base side of the second notched portion 46 toward the end side thereof. The tongue-shaped portion 45 serving as a contacting portion having an end portion expanding radially outwardly theretoward. A clearance for allowing a radially inward movement of the tongue-shaped portion 45 is formed between the tongue-shaped portion 45 and the end member 42, thereby desirably or appropriately maintaining a contact state between the end member 42 and the ceiling surface portion 11b and the bottom surface portion 11c of the second rail 11 regardless of a vertical movement of the second protruding portion 6b.

In the first embodiment, the second notched portion 46 is formed at the upper portion of the end side of the bearing portion 43 and the tongue-shaped portion 45 is formed at the base side of the second notched portion 46. In addition, notched portions may be formed respectively at the upper portion of the end side of the bearing portion 43 and at a lower portion of the end side of the bearing portion 43. Further, tongue-shaped portions may be arranged at respective base sides of the notched portions.

The arm portion 44 is formed on an end face 43b of the bearing portion 43. The arm portion 44 includes an arm base portion 44a protruding from the end face 43b of the bearing portion 43, an arm intermediate portion 44b curved and extending from the arm base portion 44a (as seen in FIGS. 5A and 5B), and an arm end portion 44c curved and extending from the intermediate arm portion 44b toward a first notched portion 48 formed in the end face 43b of the bearing portion 43. A clearance for allowing a movement of the arm portion 44 in the lateral direction of the vehicle is formed between the arm end portion 44c and the first notched portion 48, thereby desirably or appropriately maintaining a contact state between the arm portion 44 and the side surface portion 11a of the second rail 11 regardless of a movement of the second protruding portion 6b in the lateral direction.

A force occurring due to a restoring force of the arm portion 44 acts on the second rail 11 in the lateral direction of the vehicle. The lateral force acts in a direction in which the second shoe 9 is detached from the second rail 11. The lateral force of the second shoe 9 is transmitted to the first shoe 8 via the shaft attachment member 5 and the ring member 24. That is, the first and second shoes 8 and 9 are positioned at the neutral position where the lateral force of the first shoe 8 and the lateral force of the second shoe 9 are proportional to each other, thereby stabilizing the first and second shoes 8 and 9 in the lateral direction.

The L-shaped portion 49 is arranged at an outer peripheral surface of the bearing portion 43. The L-shaped portion 49 includes a base portion 49a extending in a moving direction (vertical direction in FIG. 5) of the second shoe 9 and an end portion 49b extending toward the side surface portion 11a of the second rail 11. When the arm portion 44 is moved in the lateral direction of the vehicle, the end portion 49b of the L-shaped portion 49 makes contact with the side surface portion 11a of the second rail 11, thereby preventing the arm portion 44 from further moving in the lateral direction. Thus, the arm portion 44 is allowed to make contact with the side surface 11a of the second rail 11 with an appropriate biasing force.

According to the first embodiment, the first and second shoes 8 and 9 are formed from nylon resin and the ring member 24 is formed from nitrile rubber. However, other materials may be applied to form the first and second shoes 8 and 9 and the ring member 24. For example, various types of resin and rubber are applicable depending on applications or functions. In addition, a lubricant, for example, talc, may be applied to the first and second shoes 8 and 9 in order to improve their slidability.

An operation of the sunroof apparatus will be explained as follows. In an opening operation of the sunroof 2, the drive mechanism is driven in a first direction to move the drive belt in the same direction accordingly. The first and second shoes 8 and 9 attached to the protruding pin 6 are moved in a rearward direction of the vehicle in accordance with the movement of the drive belt while being guided by the guide rail 4. The frame 3 is moved in the rearward direction while the engagement pin is guided in the groove of the frame 3. Meanwhile, in a closing operation of the sunroof 2, the driving mechanism is driven in a second direction opposite to the first direction to thereby close the sunroof 2.

During the opening and closing operations, the sunroof 2 may be moved in an upward direction of the vehicle by an external force acting from a road surface, wind pressure, and the like and the frame 3 may be moved to the same direction accordingly. At this time, an upper portion of an outer peripheral surface of the first shoe 8 makes contact with the ceiling surface portion 10b with a biasing force that is larger than an usual biasing force while a lower portion of the outer peripheral surface of the first shoe 8 makes contact with a biasing force that is smaller than a usual biasing force.

When the biasing force of the upper portion of the outer peripheral surface of the first shoe 8 is larger than the biasing force of the lower portion of the outer peripheral surface of the first shoe 8, a frictional force between the upper portion of the outer peripheral surface of the first shoe 8 and the ceiling surface portion 10b is larger than a frictional force between the lower portion of the outer peripheral surface of the first shoe 8 and the bottom surface portion 10c. Accordingly, the upper portion of the outer peripheral surface of the first shoe 8 rolls on the ceiling surface portion 10b and the lower portion of the outer peripheral surface of the first shoe 8 slides on the bottom surface portion 10c.

Thus, one of the upper and lower portions of the outer peripheral surface of the first shoe 8, which has a larger frictional force relative to a frictional force of the other of the upper and lower portions of the outer peripheral surface of the first shoe 8, is configured so as to roll, therefore enabling the sunroof 2 to slide smoothly. Moreover, in general, a rolling frictional force is relatively small, compared to a sliding frictional force that is approximately one tenth of the rolling frictional force. Consequently, an effect of the rolling frictional force may be ignored.

When wind pressure is applied to the vehicle body and while the vehicle is driven on a rough road, the sunroof 2 may be moved vertically; therefore, the protruding pin 6 is tilted obliquely from a horizontal position thereof. At this time, the contact state between the first shoe 8 and the first rail 10 and the contact state between the second shoe 9 and the second rail 11 are appropriately maintained by the elastic deformation of the contacting portion 33 and the ring member 24 and the radially inward movement of the tongue-shaped portion 45.

When the vehicle turns, the sunroof 2 is moved in the lateral direction of the vehicle to therefore move the protruding pin 6 from a neutral position in the lateral direction. At this time, the elastic deformation of the contacting portion 33 and the ring member 24 and the radially inward movement of the arm portion 44 generates a restoring force for returning the first and second shoes 8 and 9 to the respective neutral positions. Accordingly, a condition where the first shoe 8 is not in contact with the first rail 10 is maintained.

Figure 6:
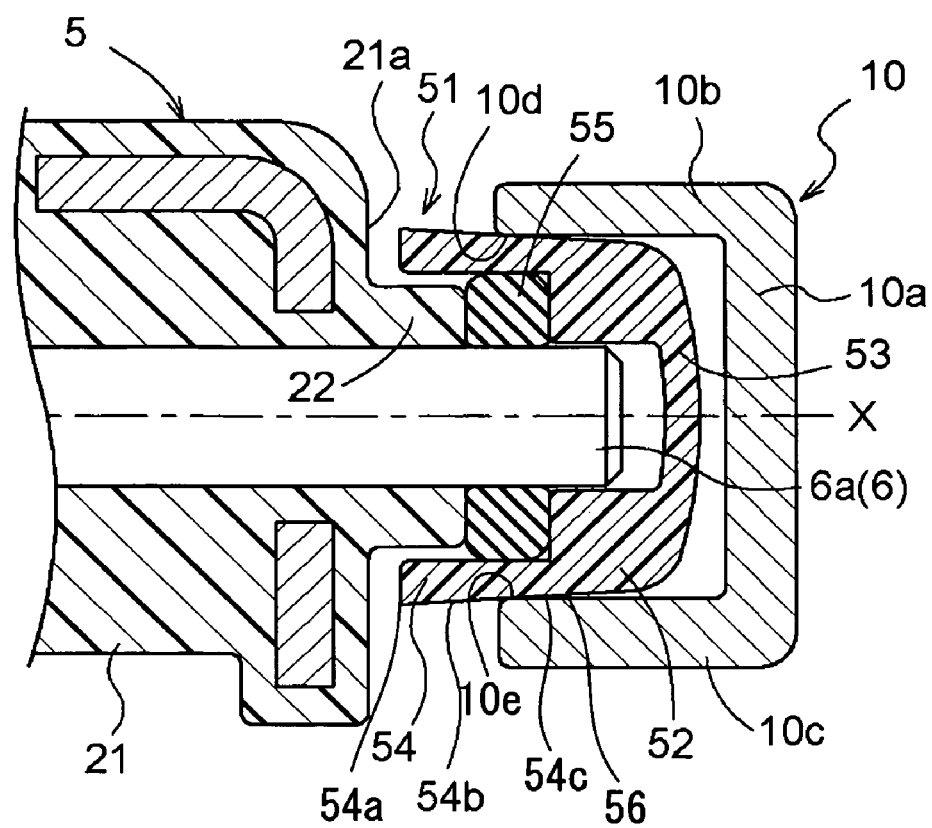
FIG. 6 is a cross-sectional view of the first shoe according to a second embodiment disclosed here.

A second embodiment will be explained below. The same configurations as those of the first embodiment will be omitted and different configurations from those of the first embodiment will be described as follows. A first shoe 51 and a ring member 55 according to the second embodiment will be described below. As shown in FIG. 6, the first shoe 51 includes a bearing portion 52 coaxially supporting the first protruding portion 6a and a contacting portion (cylindrical portion) 54 sliding along the first rail 10 while being in contact with the ceiling surface portion 10b and the bottom surface portion 10c of the first rail 10 in a biased manner.

An insertion hole into which the first protruding portion 6a is inserted is formed in a first end portion 53 of the bearing portion 52. The insertion hole is different from the through-hole 32a of the first embodiment in that the insertion hole does not penetrate through the first end portion 53 of the bearing portion 52. A clearance is formed between a bottom face of the insertion hole and the end face 34 of the first protruding portion 6a and thereby prevents the first protruding portion 6a from sliding out of the bearing portion 52 while allowing a slight movement of the first protruding portion 6a in the lateral direction of the vehicle. The first end portion 53 of the bearing portion 52 is formed in a spherical shape.

According to the second embodiment, the insertion hole does not penetrate through the first end portion 53 of the bearing portion 52. Alternatively, the insertion hole may penetrate through the first end portion 53 of the bearing portion 52. Even when the insertion hole penetrates through the first end portion 53 of the bearing portion 52, a rib protruding radially inwardly is appropriately formed along the insertion hole to thereby prevent the first protruding portion 6a from sliding out of the bearing portion 52.

The contacting portion 54 including first and second ends 54c and 54a oppositely arranged in the axial direction X of the bearing portion 55 is formed at a second end portion 56 of the bearing portion 52. The first end portion 54c having an outer diameter smaller than an outer diameter of the second end portion 54a of the contacting portion 54 is continuously formed with the bearing portion 55. The contacting portion 54 is flexible and tapered so as to have a diameter that is larger toward the second end portion 56 of the bearing portion 52. The contacting portion 54 is in contact with the first guide portion 10d formed at the free end of the ceiling surface portion 10b and with the second guide portion 10e formed at the free end of the bottom surface portion 10c in a biased manner. The ring member 55 having a rectangular cross-section is accommodated between the contacting portion 54 and the first protruding portion 6a. In such case, the ring member 55 may be configured so as to be hollow or a notched portion may be formed in the ring member 55 in order to allow the ring member 55 to be easily deformed.

According to the aforementioned first and second embodiments, the first shoe 8 is attached to the first protruding portion 6a and the second shoe 9 is attached to the second protruding portion 6b. In addition, the position of the first shoe 8 and the position of the second shoe 9 may be reversed in the lateral direction of the vehicle so that the first and second shoes 8 and 9 are arranged at the interior and exterior sides of the vehicle, respectively. Alternatively, the first shoes 8 may be arranged at the first and second protruding portions 6a and 6b, respectively, or the second shoes 9 may be arranged at the first and second protruding portions 6a and 6b, respectively.

According to the aforementioned first and second embodiments, the protruding pin 6 is attached to the shaft attachment member 5 so as to penetrate therethrough and protrude from the both ends of the shaft attachment member 5 in the lateral direction of the vehicle. Further, the first shoe 8 is attached to the first protruding portion 6a of the protruding pin 6 while the second shoe 9 is attached to the second protruding portion 6b of the protruding pin 6. Alternatively, the protruding pin 6 may be attached to the shaft attachment member 5 of the frame 3 so as to protrude from one of the both ends of the shaft attachment member 5 and the first shoe 8 or the second shoe 9 may be attached to a protruding portion of the protruding pin 6.

According to the aforementioned first and second embodiments, the protruding pin 6 is configured so as to protrude from the both ends of the shaft attachment member 5 in the lateral direction of the vehicle. In addition, the protruding pin 6 may be formed so as to protrude directly from both sides of the frame 3 in the lateral direction.

According to the aforementioned first and second embodiments, the ring member 24, 55 is attached to the first protruding portion 6a and arranged in contact with the inner peripheral side of the contacting portion 33, 54. Alternatively, the ring member 24, 55 may neither be attached to the first protruding portion 6a nor arranged in the inner peripheral side of the contacting portion 33, 54.

According to the aforementioned first and second embodiments, the outer peripheral surface 32b of the curved portion 32 and the first end portion 53 of the bearing portion 52 are formed in the spherical shapes, respectively. In addition, the outer peripheral surface 32b of the curved portion 32 and the first end portion 53 of the bearing portion 52 may be formed in curved shapes, respectively, such as an elliptic curved shape, a parabolic curved shape, and the like. In short, when a large centrifugal force acts in the lateral direction of the vehicle, it is appropriate for the outer peripheral surface 32b of the curved portion 32 or the first end portion 53 of the bearing portion 52 to make contact with the side surface portion 10a of the first rail 10 at a small contact surface therebetween.

According to the aforementioned first and second embodiments, an end of the outer peripheral surface 32b at the end side of the curved portion 32 is arranged adjacent to the side surface portion 10a of the first rail 10 but is not in contact with the side surface portion 10a. Further, the lateral force of the first shoe 8 due to the inclination of the outer peripheral surface 33b of the contacting portion 33 is proportional to the lateral force of the second shoe 9 due to the restoring force of the arm portion 44. In addition, the end of the outer peripheral surface 32b at the end side of the curved portion 32 may be in contact with the side surface portion 10a of the first rail. At this time, the first shoe 8 is consistently pressed in a biased manner against the side surface portion 10a of the first rail 10 to thereby stabilize the first and second shoes 8 and 9 in the lateral direction of the vehicle.

The support mechanism for the opening and closing member described in the aforementioned embodiments may be applicable to a sunroof for a vehicle and the like.

As described above, for example, it is desirable for the opening and closing member such as the sunroof 2 to smoothly move along the guide rail 4 during the opening and closing operation. In particular, external forces act on the sunroof 2 from various directions such as the vertical and lateral directions of the vehicle while the vehicle is moving. Such external forces include an external force acting from a road surface, a centrifugal force while the vehicle is turning, wind pressure, and the like. The external force acting in the vertical direction among the above-mentioned external forces is especially frequently applied to the sunroof 2. A friction between the frame 3 of the sunroof 2 and the guide rail 4 increases because of the external force. Further, the frame 3 and the guide rail 4 hit against each other, therefore generating noise. Furthermore, some components may be damaged.

According to the aforementioned configuration of the support mechanism for the sunroof 2, an external force acting obliquely from the outer peripheral surface 33b, 54b having the tapered shape may be applied to an edge of the first rail 10. For example, in a condition where the first and second guide portions 10d and 10e of the first rail 10 are arranged in parallel to each other in the vertical direction of the vehicle, the first shoe 8 is supported relative to the first rail 10 by forces acting in the vertical and lateral directions, respectively. The force acting in the vertical direction mainly supports the weight of the sunroof 2 while the force acting in the lateral direction acts so as to be mainly resistive against a centrifugal force and the like occurring while the vehicle is turning. The force occurring due to the inclination of the tapered outer peripheral surface 33b, 54b acts in a direction in which the first shoe 8 is detached from the first rail 10. That is, since a unidirectional load is consistently applied to the first shoe 8, the first shoe 8 is stabilized in the lateral direction.

Thus, the first shoe 8 simply configured so as to have the tapered outer peripheral surface 33b, 54b may be appropriately guided along the first rail 10, thereby realizing a smooth sliding movement of the sunroof 2.

According to the aforementioned first embodiment, the bearing portion 31 is formed into the cylindrical shape and provided within the contacting portion 33. The contacting portion 33 includes the first end portion 33c and the second end portion 33a oppositely arranged in the axial direction X of the bearing portion 31 and the first end portion 33c having the outer diameter smaller than the outer diameter of the second end portion 33a is continuously formed with the bearing portion 31.

Accordingly, the first shoe 8 is formed so as to include a double cylindrical configuration. As a result, the outer peripheral surface 33b of the contacting portion 33 contacting the first and second guide portions 10d and 10e and a portion of the bearing portion 31, which slidably contacts the protruding pin 6 are arranged radially with respect to a rotation axis of the first shoe 8. Thus, when a biasing force of the first shoe 8 acts on the first rail 10, a bending force varying a position of the rotation axis of the first shoe 8 does not occur, so that the first shoe 8 may further stably rotate.

According to the aforementioned first embodiment, the protruding pin 6 includes the first protruding portion (small diameter portion) 6a having the predetermined outer diameter and the rib-shaped member (large diameter portion) 22 arranged side by side relative to the first protruding portion 6a in the axial direction X and having the outer diameter larger than the predetermined outer diameter of the small diameter portion. The contacting portion 33 is configured so that the second end portion 33a having the outer diameter larger than the outer diameter of the first end portion 33c protrudes further along the axial direction X than the first end portion 31c of the bearing portion 31. Further, the first protruding portion 6a of the protruding pin 6 is supported by the bearing portion 31 coaxially in the axial direction X, and the second end portion 33a of the cylindrical portion 33, protruding further than the first end portion 31c of the bearing portion 31 is radially outwardly adjacent to the rib-shaped member 22 of the protruding pin 6.

The stability of the rotation of the first shoe 8 depends on dimensions of a clearance between the protruding pin 6 and the bearing portion 31 supporting the protruding pin 6. In cases where an impact load is applied to the vehicle, a momentary bending load acts on the bearing portion 31. At this time, the orientation of the first shoe 8 varies and an axial runout of the first shoe 8 may occur. As a result, noise occurs during the opening and closing operations of the sunroof 2 or the sunroof 2 unsteadily moves because of the friction excessively increased between the components.

According to the aforementioned configuration of the support mechanism, the second end portion 33a of the contacting portion 33 protrudes further toward the interior side of the vehicle in the lateral direction than the first end portion 31c of the bearing portion 31. Accordingly, even when the axial runout of the first shoe 8 occurs, such protruding portion of the contacting portion 33 makes contact with the large diameter portion (rib-shaped member 22) of the shaft portion, thereby preventing the further axial runout of the first shoe 8. As a result, the first shoe 8 may rotate steadily.

According to the aforementioned first and second embodiments, the support mechanism further includes the ring member 24, 55 formed by a material that is more flexible than a material forming the contacting portion 33, 54. The ring member 24, 55 is in contact with the inner peripheral side of the contacting portion 33, 54 so that the outer peripheral surface 33b, 54b of the cylindrical portion 33, 54 is pressed against the first and second guide portions 10d, 10e of the first rail 10 in the biased manner.

According to the aforementioned configuration of the support mechanism, even in cases where a strong impact load acts on the vehicle in the vertical direction, the ring member 24, 55 may prevent the contacting portion 33, 54 from being excessively deformed. Accordingly, one portion of the contacting portion 33, 54 is not away from the first guide portion 10d or the second guide portion 10e and the contacting portion 33, 54 may be consistently pressed against the first and second guide portions 10d and 10e. As a result, vibration between the sunroof 2 and the first rail 10 is surely inhibited.

According to the aforementioned disclosure, the first/second rail 10 is configured by a member including a receded cross-section that has the ceiling surface portion 10b and the bottom surface portion 10c facing in parallel to each other. The first and second guide portions 10d and 10e are separately formed at the respective free ends of the ceiling surface portion 10b and the bottom surface portion 10c. Further, the curved portion 32 continuously extending between the bearing portion 31 and the contacting portion 33 of the first shoe 8 has the rigidity higher than the rigidity of the cylindrical portion.

The first shoe 8 is guided into the first rail 10 by the first and second guide portions 10d and 10e that are formed into linear shapes, respectively. Under normal conditions, upper and lower portions of the outer peripheral surface 33b, 54b of the contacting portion 33, 54 are in contact with the first and second guide portions 10d and 10e, respectively at one point. However; when an impact load acts on the vehicle, the first shoe 8 is moved close toward one of the first and second guide portions 10d and 10e. Under this condition, a wall portion of the contacting portion 33, 54 is flexibly deformable; therefore, the first shoe 8 may be moved excessively in the vertical direction.

In order to prevent such vertical movement of the first shoe 8, the first shoe 8 is configured so that the curved portion 32 between the bearing portion 31 and the contacting portion 33 has the rigidity higher than the rigidity of the contacting portion 33. Further, the first rail 10 is formed by a member having a recessed shape in cross-section. Furthermore, the ceiling surface portion 10b including the first guide portion 10d is formed in parallel to the bottom surface portion 10c including the second guide portion 10e. Thus, when the first shoe 8 is moved close toward one of the first and second guide portions 10d and 10e as described above, the curved portion 32 having the high rigidity makes contact with either the ceiling surface portion 10b or the bottom surface portion 10c of the first rail 10. Accordingly, the first shoe 8 is prevented from further moving in the vertical direction, therefore realizing the smooth movement of the sunroof 2.

According to the aforementioned first embodiment, a surface of the first end portion of the second shoe 9 having the outer diameter smaller than the outer diameter of the second end portion is formed into the convex shape, and the first end portion having the convex shape is positioned in the recessed space inside the second rail 11 and arranged adjacent to the side surface portion 11a of the second rail 11.

While the vehicle is turning, a centrifugal force acts in the lateral direction of the vehicle. According to the aforementioned configuration of the support mechanism, a contacting force of the tapered outer peripheral surface 33b, 54b of the contacting portion 33, 54 acts as a resistive force against the first rail 10, therefore preventing the contacting portion 33, 54 from further moving in the lateral direction.

However; when a lateral force stronger than the above-mentioned contacting force acts on the first shoe 8, the orientation of the sunroof 2 may not be maintained only by the tapered outer peripheral surface 33b, 54b of the contacting portion 33, 54. Accordingly, the first end portion of the second shoe 9 is formed in the convex shape and the convex shaped portion of the second shoe 9 is arranged adjacent to the side surface portion 11a of the second rail 11. Thus, when the centrifugal force acts in the lateral direction as described above, the convex shaped portion of the first end portion of the second shoe 9 makes contact with the second rail 11, thereby preventing the sunroof 2 from further moving in the lateral direction.

In addition, the movement of the first shoe 8 in the lateral direction is inhibited to thereby bring a certain portion of the tapered outer peripheral surface 33b, 54b of the contacting increase and decrease of an external diameter of the contacting portion 33, 54 having an umbrella shape is prevented. Accordingly, a pressing force acting between the first shoe 8 and the first rail 10 is constant and a friction force between the first shoe 8 and the first rail 10 is constant, therefore realizing the smooth movement of the sunroof 2.

According to the aforementioned first embodiment, the flanged portion 32c serving as the protrusion preventing portions preventing the first protruding portion 6a of the protruding pin 6 from sliding out of the bearing portion 31 is provided at the second end portion 31e of the bearing portion 31 arranged adjacent to the side surface portion 10a of the first rail 10.

When an external force acts in the lateral direction, the first/second shoe 8, 9 is moved relatively to the protruding pin 6 along the axial direction X. When the relative movement of the first/second shoe 8, 9 to the protruding pin 6 excessively increases, the protruding pin 6 slides out of the first/second shoe 8, 9 and makes contact with the side surface portion 10a, 11a of the first/second rail 10, 11. In such case, the slidability of the first/second shoe 8, 9 deteriorates. In addition, when a range of the movement of the protruding pin 6 along the axial direction X increases, vibration of the sunroof 2 may increase in accordance with the increase of the movement of the protruding pin 6.

According to the aforementioned configuration of the support mechanism, the first second shoe 8 includes the flanged portion 32c serving as the protrusion preventing portion preventing the protruding pin 6 from sliding out of the first shoe 8. Accordingly, the first shoe 8 is prevented from interfering with the first rail 10. Thus, a contact resistance between the first shoe 8 and the first rail 10 does not suddenly occur. In addition, a stroke of the protruding pin 6 relative to the bearing portion 31 is limited to thereby prevent vibration and noise caused by vibration therebetween.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A support mechanism for an opening and closing member slidably moving to open and close an opening formed in a vehicle body, comprising:
    a support frame adapted to be arranged at the opening and closing member to support the opening and closing member relative to the vehicle body;
    a guide rail adapted to be arranged at the vehicle body along a side edge of the opening and including first and second guide portions that are parallel to each other; and
    a guided member including a cylindrical portion and a bearing portion continuously formed with the cylindrical portion and coaxially supporting a shaft portion that is arranged at the support frame, the cylindrical portion having an outer peripheral surface formed into a tapered shape and contacting the first and second guide portions in a biased manner;
    wherein the cylindrical portion includes a first end portion and a second end portion oppositely arranged in an axial direction of the bearing portion and the first end portion has an outer diameter smaller than an outer diameter of the second end portion and is continuously formed with the bearing portion.

2. The support mechanism according to claim 1, wherein the shaft portion includes a small diameter portion having a predetermined outer diameter and a large diameter portion arranged side by side relative to the small diameter portion in the axial direction and having an outer diameter larger than the predetermined outer diameter of the small diameter portion, and the cylindrical portion is configured so that the second end portion having the outer diameter larger than the outer diameter of the first end portion protrudes further along the axial direction than a first end portion of the bearing portion,
    and wherein the small diameter portion of the shaft portion is supported by the bearing portion coaxially in the axial direction, and the second end portion of the cylindrical portion, protruding further than the first end portion of the bearing portion is radially outwardly adjacent to the large diameter portion of the shaft portion.

3. The support mechanism according to claim 1, further comprising an elastic member formed by a material that is more flexible than a material forming the cylindrical portion, wherein the elastic member is in contact with an inner peripheral side of the cylindrical portion so that the outer peripheral surface of the cylindrical portion is pressed against the first and second guide portions of the guide rail in a biased manner.

4. The support mechanism according to claim 1, further comprising an elastic member formed by a material that is more flexible than a material forming the cylindrical portion, wherein the elastic member is in contact with an inner peripheral side of the cylindrical portion so that the outer peripheral surface of the cylindrical portion is pressed against the first and second guide portions of the guide rail in a biased manner.

5. The support mechanism according to claim 1, further comprising an elastic member formed by a material that is more flexible than a material forming the cylindrical portion, wherein the elastic member is in contact with an inner peripheral side of the cylindrical portion so that the outer peripheral surface of the cylindrical portion is pressed against the first and second guide portions of the guide rail in a biased manner.

6. A support mechanism for an opening and closing member slidably moving to open and close an opening formed in a vehicle body, comprising:
    a support frame adapted to be arranged at the opening and closing member to support the opening and closing member relative to the vehicle body;
    a guide rail adapted to be arranged at the vehicle body along a side edge of the opening and including first and second guide portions that are parallel to each other; and
    a guided member including a cylindrical portion and a bearing portion continuously formed with the cylindrical portion and coaxially supporting a shaft portion that is arranged at the support frame, the cylindrical portion having an outer peripheral surface formed into a tapered shape and contacting the first and second guide portions in a biased manner;
    wherein the guide rail is configured by a member including a receded cross-section that has wall portions facing in parallel to each other, and the first and second guide portions are separately formed at respective free ends of the wall portions,
        and wherein a continuously formed portion continuously extending between the bearing portion and the cylindrical portion of the guided member has rigidity higher than rigidity of the cylindrical portion.

7. The support mechanism according to claim 1, wherein the guide rail is configured by a member including a receded cross-section that has wall portions facing in parallel to each other, and the first and second guide portions are separately formed at respective free ends of the wall portions,
    and wherein a continuously formed portion continuously extending between the bearing portion and the cylindrical portion of the guided member has rigidity higher than rigidity of the cylindrical portion.

8. The support mechanism according to claim 2, wherein the guide rail is configured by a member including a receded cross-section that has wall portions facing in parallel to each other, and the first and second guide portions are separately formed at respective free ends of the wall portions,
    and wherein a continuously formed portion continuously extending between the bearing portion and the cylindrical portion of the guided member has rigidity higher than rigidity of the cylindrical portion.

9. The support mechanism according to claim 3, wherein the guide rail is configured by a member including a receded cross-section that has wall portions facing in parallel to each other, and the first and second guide portions are separately formed at respective free ends of the wall portions,
    and wherein a continuously formed portion continuously extending between the bearing portion and the cylindrical portion of the guided member has rigidity higher than rigidity of the cylindrical portion.

10. The support mechanism according to claim 4, wherein the guide rail is configured by a member including a receded cross-section that has wall portions facing in parallel to each other, and the first and second guide portions are separately formed at respective free ends of the wall portions, and wherein a continuously formed portion continuously extending between the bearing portion and the cylindrical portion of the guided member has rigidity higher than rigidity of the cylindrical portion.

11. The support mechanism according to claim 5, wherein the guide rail is configured by a member including a receded cross-section that has wall portions facing in parallel to each other, and the first and second guide portions are separately formed at respective free ends of the wall portions, and wherein a continuously formed portion continuously extending between the bearing portion and the cylindrical portion of the guided member has rigidity higher than rigidity of the cylindrical portion.

12. The support mechanism according to claim 6, wherein a surface of a first end portion of the guided member having an outer diameter smaller than an outer diameter of a second end portion is formed into a convex shape, and the first end portion having the convex shape is positioned in a recessed space inside the guide rail and arranged adjacent to a center wall portion arranged between the wall portions of the guide rail.

13. The support mechanism according to claim 6, wherein a protrusion preventing portion preventing the small diameter portion of the shaft portion from sliding out of the bearing portion is provided at a second end portion of the bearing portion, which is arranged adjacent to a center wall portion arranged between the wall portions of the guide rail.

14. The support mechanism according to claim 12, wherein a protrusion preventing portion preventing the small diameter portion of the shaft portion from sliding out of the bearing portion is provided at a second end portion of the bearing portion, which is arranged adjacent to the center wall portion of the guide rail.

15. A support mechanism for an opening and closing member slidably moving to open and close an opening formed in a vehicle body, comprising:

a support frame adapted to be arranged at the opening and closing member to support the opening and closing member relative to the vehicle body;

a guide rail adapted to be arranged at the vehicle body along a side edge of the opening and including first and second guide portions that are parallel to each other;

a guided member including a cylindrical portion and a bearing portion continuously formed with the cylindrical portion and coaxially supporting a shaft portion that is arranged at the support frame, the cylindrical portion having an outer peripheral surface formed into a tapered shape and contacting the first and second guide portions in a biased manner; and an elastic member pressing the outer peripheral surface of the cylindrical portion against the first and second guide portions in a biased manner.

\* \* \* \* \*